(12) United States Patent
Dasgupta

(10) Patent No.: US 6,886,014 B1
(45) Date of Patent: Apr. 26, 2005

(54) MODIFIABLE UNIVERSAL RESOURCE LOCATORS (MURLS)

(75) Inventor: Aninda Dasgupta, Croton-On- Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 811 days.

(21) Appl. No.: 09/116,564

(22) Filed: Jul. 15, 1998

(51) Int. Cl.[7] .......................... G06F 17/30; G06F 15/16
(52) U.S. Cl. ................................. 707/10; 707/3; 707/4; 707/100; 707/102; 707/200; 709/217; 709/206
(58) Field of Search .............................. 707/7, 3, 4, 10, 707/100, 102, 200; 709/217, 206; 705/27, 1, 14, 26

(56) References Cited

U.S. PATENT DOCUMENTS

| | | | | |
|---|---|---|---|---|
| 5,822,539 A | * | 10/1998 | Van Hoff .................... | 395/200 |
| 5,878,219 A | * | 3/1999 | Vance, Jr. et al. .......... | 395/200 |
| 5,930,474 A | * | 7/1999 | Dunworth et al. .......... | 395/200 |
| 5,968,125 A | * | 10/1999 | Garrick et al. .............. | 709/224 |
| 5,991,798 A | * | 11/1999 | Ozaki et al. ................. | 709/214 |
| 6,018,710 A | * | 1/2000 | Wynblatt et al. ........... | 704/260 |
| 6,037,934 A | * | 3/2000 | Himmel et al. ............. | 345/335 |
| 6,041,360 A | * | 3/2000 | Himmel et al. ............. | 709/245 |
| 6,049,812 A | * | 4/2000 | Bertram et al. ............. | 707/516 |
| 6,061,700 A | * | 5/2000 | Brobst et al. ................ | 707/517 |
| 6,163,779 A | * | 12/2000 | Mantha et al. .............. | 707/100 |
| 6,208,995 B1 | * | 3/2001 | Himmel et al. ............. | 707/104 |

OTHER PUBLICATIONS

K. Weber, "Chapter 6, in which Pooh proposes improvements to Web authoring tools, having seen said tools for the Unix platform", Computer Networks and ISDN Systems, vol. 27, No. 6, Apr. 1995, pp. 823–829.

* cited by examiner

Primary Examiner—Vincent Millin
Assistant Examiner—Ella Colbert
(74) Attorney, Agent, or Firm—Gregory L. Thorne

(57) ABSTRACT

This invention facilitates the relocation of a hypertext document and objects referenced by hypertext items. The Universal Resource Locators (URLs) in a hypertext document are identified and assessed. A modifiable URL is a URL that is associated with an object that has been relocated, or with an object that will be relocated when the hypertext document is relocated. Each modifiable URL in the document is modified to reflect the relocation of each object, and each object that has not yet been relocated is relocated. If any relocated object is another hypertext document, this other document is similarly processed to identify and update each modifiable URL, each object requiring relocation is relocated, and each relocated hypertext document is subsequently similarly processed.

12 Claims, 4 Drawing Sheets

MODIFIABLE UNIVERSAL RESOURCE LOCATORS (MURLS)

FIELD OF THE INVENTION

This invention relates generally to the field of computers and communication, and in particular to the transfer of documents and objects that contain references to other documents and objects.

BACKGROUND OF THE INVENTION

Hypertext and its equivalents have become commonplace in computer documents. A hypertext item is an item that can be used to access additional documents or other computer objects. For example, in a document that addresses radio communications, Marconi's name may appear highlighted on the computer display, the highlighting indicating that Marconi's name is a hypertext item. If the reader of the document selects the highlighted text, Marconi's biography may appear on the display. Similarly, hyperlinks may display Marconi's image, or perhaps a video or audio clip.

Hypertext is implemented by associating a reference locator to the hypertext item. When the hypertext item is selected, the object that is located at the location indicated by the reference locator is displayed or executed. That is, in general, the reference locator may point to another document, an image file, etc. or it may point to a program that plays the video clip. The reference locator is commonly termed a "Universal Resource Locator" ("URL"), and the programming language used to embed hypertext and the associated URLs into a document is termed the "HyperText Markup Language" ("HTML"). A typical example of a hypertext entry is:

The invention of <A HREF="gifs/radio.gif">radio </A> is credited to <A HREF="http://www.encyclopedia.com/inventors/marconi.htl"> Marconi </A>.

The "<A>" and "</A>" entries define the beginning and end of the hypertext entry. This example shows two hypertext entries, one for "radio" and one for "Marconi". The "HREF=" entries define the URL associated with each of the hypertext entries. Because the words radio and Marconi are contained within the hypertext bounds, they will be displayed by an HTML processing program as highlighted text. The URLs are not displayed. When a user selects the text "Marconi", the program will open the file that is named "marconi.htl" that is located in the file directory "inventors" on the machine named "www.encyclopedia.com" on the world wide web ("http://"). When the user selects "radio" the program will open the file named "radio.gif" in the file directory "gifs" within the current file directory of the current machine. That is, because the URL associated with "radio" does not specify a particular machine name, the specified file name is relative to the location of the document being processed. Conversely, the address associated with "Marconi" is absolute, and independent of the location of the document that contains this reference.

The use of absolute references allows the document containing the references to be located anywhere and still provide access to the referenced URL. It requires, however, that the absolute reference be known and specified at the time the document is created. Relative addressing, on the other hand, allows the reference locators to be dynamically determined, based upon the location of the document. If the document is a part of a large suite of documents and objects, relative addressing is typically preferred, because it allows the suite of documents and objects to be located on different machines without modification of the reference locators. That is, for example, if the above example document is always located in a file directory that includes a file subdirectory named "gifs" that contains the object "radio.gif", the above HTML example for the "radio" hypertext will operate properly regardless of where the file directory that contains the document and "gifs" is located, and does not require an a priori absolute reference to "radio.gif". That is, "radio.gif" can be relocated as required, without requiring a modification to the HTML reference, provided that it maintains the same file directory relationship with the document. Conversely, if the file "marconi.htl" is relocated, all documents that contain an absolute reference to this file must be modified.

Further compounding the problems associated with reference locators is that the author of an HTML document typically authors the document on one computer system, while the viewing, or browsing, of the document is intended for a different computer system. Relative reference locators, for example, require that the file structure of the destination computer system be the same as that of the authoring computer system. That is, in the "radio" example, both the authoring system and the destination system must be configured such that the file "radio.gif" is within a directory called "gifs" that is in the same directory as the document. Often, however, a file structure suitable for authoring a document is an inefficient file structure for reading or browsing documents. A general purpose authoring system, for example, may be structured to have a directory called "pictures" that contains directories "gifs", "avi" and "mpg", corresponding to different forms of images that may be included in an authored document. The "gifs" directory may contain directories "people", "places", and "things", corresponding to the different types of "gifs" available, in terms of content. The file "radio.gif" may be located, for example, within the directory "pictures/gifs/things". Such a structure allows an author to pick and choose from a variety of objects for inclusion in a particular hypertext document. The destination system, on the other hand, may be a commercial web service machine, and a storage fee may be charged that is dependent upon the number of objects stored on the machine, or the number of file directories utilized. In this case, it would be inefficient and costly to copy the entire directory structure of the authoring system onto the commercial web service machine. To ease the migration of the authored system to a destination system, the author may structure a file system that conforms to the intended destination system and transfer each object that is referenced into this file structure. This approach, however, virtually eliminates the ease of use provided by the general purpose authoring file structure. To ease the authoring task, on the other hand, the author may use the general purpose authoring file structure, but thereafter be required to modify each hypertext documents to conform to the destination file structure and also transfer each of the referenced objects and files from the authoring system to the destination file structure. In either case, the movement of hypertext documents is problematic, due to the use of URLs in the conventional manner.

The MIME format has been developed to facilitate the transfer of hypertext documents. In accordance with the MIME format, when a reference locator is found in a document, the object that corresponds to the reference locator is encoded and embedded directly into the document. The resultant document can become significantly large, and requires a subsequent MIME decoding upon receipt into a format compatible for viewing. Although the MIME format is robust, the encoding and decoding process introduces additional overhead processing costs and time, and may not necessarily be compatible with all current and future forms of information transfer.

Therefore, a need exists for a method and apparatus for relocating hypertext documents that efficiently and effectively makes the adjustments required for both relative and absolute reference locators in the hypertext document. A need also exists for a method and apparatus for relocating the objects that are referenced in a relocated hypertext document, so as to correspond to the adjusted relative and absolute reference locators in the relocated hypertext document. A need also exists for a method and apparatus that provides for the transfer of hypertext documents and referenced objects with minimal intermediate processing or encoding.

DETAILED DESCRIPTION OF THE PREFERRED EMBODIMENT

In general, the invention facilitates the relocation of a hypertext document and objects referenced by hypertext items through the use of Modifiable Uniform Reference Locators (MURLs). The URLs in a hypertext document are identified and assessed. A modifiable URL is a URL that is associated with an object that has been relocated, or with an object that will be relocated when the hypertext document is relocated. Each modifiable URL in the document is modified to reflect the relocation of each object, and each object that has not yet been relocated is relocated. If any relocated object is another hypertext document, this other document is similarly processed to identify and update each modifiable URL, each object requiring relocation is relocated, and each relocated hypertext document is subsequently similarly processed.

Figure 1:
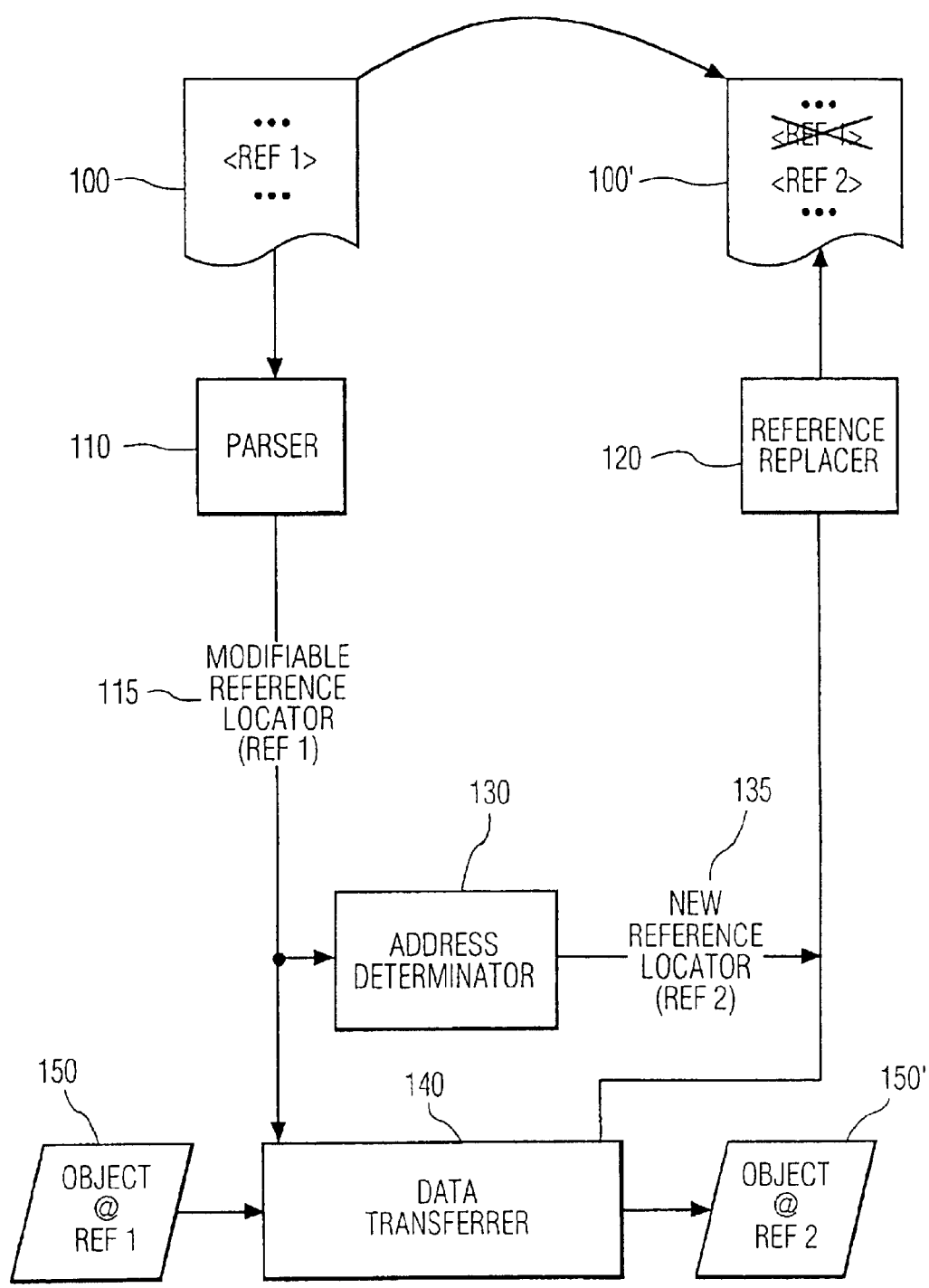
FIG. 1 illustrates a flow-diagram for processing a hypertext document in accordance with this invention.

FIG. 1 illustrates a flow diagram of an embodiment of this invention. A parser 110 analyzes a document 100 to identify modifiable reference locators 115. An example modifiable reference locator 115 is shown as REF 1 in the document 100. An address determinator 130 determines a new reference locator 135, for each modifiable reference locator 115. In FIG. 1, REF 2 is the new reference locator 135 corresponding to the object referenced by REF 1. A reference replacer 120 replaces the modifiable reference locator REF 1 in document 100 with the new reference locator REF 2, forming a modified document 100'. If the object 150 that is referenced by REF 1 is not yet moved to REF 2, a data transferrer 140 transfers the object 150, or a copy of the object 150, to REF 2, shown in FIG. 1 as object 150'. Each modifiable reference locator that is contained in the document 100 is similarly identified and replaced, and each referenced object is relocated as required.

In accordance with another aspect of this invention, the parser 110 also identifies which of the objects 150 are documents, which may contain references to other objects. The parser 110 maintains a list of such documents and sequentially processes each of the documents. In this manner all hypertext items related to the original document are automatically processed, all referenced objects are relocated as required, and all modifiable URLs are updated accordingly. To resolve relative references, the aforementioned list of documents contains the file directory location of the parent document that references each document.

The parser 110 determines which reference locators are modifiable. This can be effected in a variety of means. The most direct means is for the author of the document to explicitly identify each modifiable reference locator, for example, by using a unique identifier, such as "MREF=" in lieu of the conventional "HREF=". Alternatively, the parser 110 can prompt the user of this invention for a determination, each time a new reference locator is found in the document. The parser 110 may also use default rules, such as to consider all reference locators as modifiable, except those that contain an absolute reference to a World Wide Web (www) location.

The address determinator 130 determines a new reference locator for each modifiable reference locator 115 identified by the parser 110. This can be effected in a variety of means. The most direct is to prompt the user of this invention for each new reference locator. Alternatively, the address determinator 130 may use default rules, such as to append the object file name on the source system to a current parent file directory on the destination system. That is, for example, if the object 150 is a file "object1.gif", having a reference locator of "path1/object1.gif", the object 150' will be assigned a new reference locator of "path2/object1.gif". In this example, "path1" is the file directory at which the object file is located, and "path2" is the file directory at which the object file, or copy of the object file, is to be located. In this manner, the user need only identify the reference locator for "path2" and default names for all subsequent new reference locators will be automatically generated. If a conflict arises using the default names, for example because two different objects produce the same default name, or because the default name is invalid on the destination system, the user is prompted to resolve the conflict. To avoid such conflicts, the address determinator 130 can be configured to create unique and valid names for each new reference locator, such as "path2/obj$001", "path2/obj$002", etc. Alternatively, the destination system may provide a utility function that generates unique locator names, and the address determinator 130 need only call this utility function. The address determinator 130 maintains a list of corresponding source and destination reference locators, so that if the document 100 contains multiple occurrences of the same modifiable reference locator 115, the same new reference locator 135 will be provided for each occurrence.

The data transferrer 140 transfers the object 150 at the source location corresponding to the modifiable reference locator 115 to the destination location corresponding to the new reference locator 135. The transfer may be effected in a variety of means. In a "client-push" implementation, the data transferrer 140 is located at the source system, and initiates a transfer of the object to the destination system. In a "client-pull" implementation, the data transferrer 140 is located at the destination system, and initiates a request for transfer of the object from the source system. In a preferred embodiment, the transfer of each object is effected automatically, upon receipt of the modifiable reference locator 115 from the parser 110, and the new reference locator 135 from the address determinator 130. Alternatively, the user may be provided a list of objects that require transfer, or may be prompted for each object transfer. In a preferred embodiment, the data transferrer 140 maintains a list of transferred objects, to minimize redundant transfers for multiple occurrences of the same modifiable reference locator 115.

Note that in accordance with this invention, the hypertext document and each of the objects referenced by reference locators are transferred to a destination system in substantially the same form as they exist on the source system, obviating the need for special purpose encoders or decoders in this transfer process. Note also that, because the document and objects are transferred in the same form as on the source system, the same programs and processes used to view the document and objects on the source system can be used on the destination system with a minimal risk of an incompatibility being introduced by the transfer process.

Figure 2:
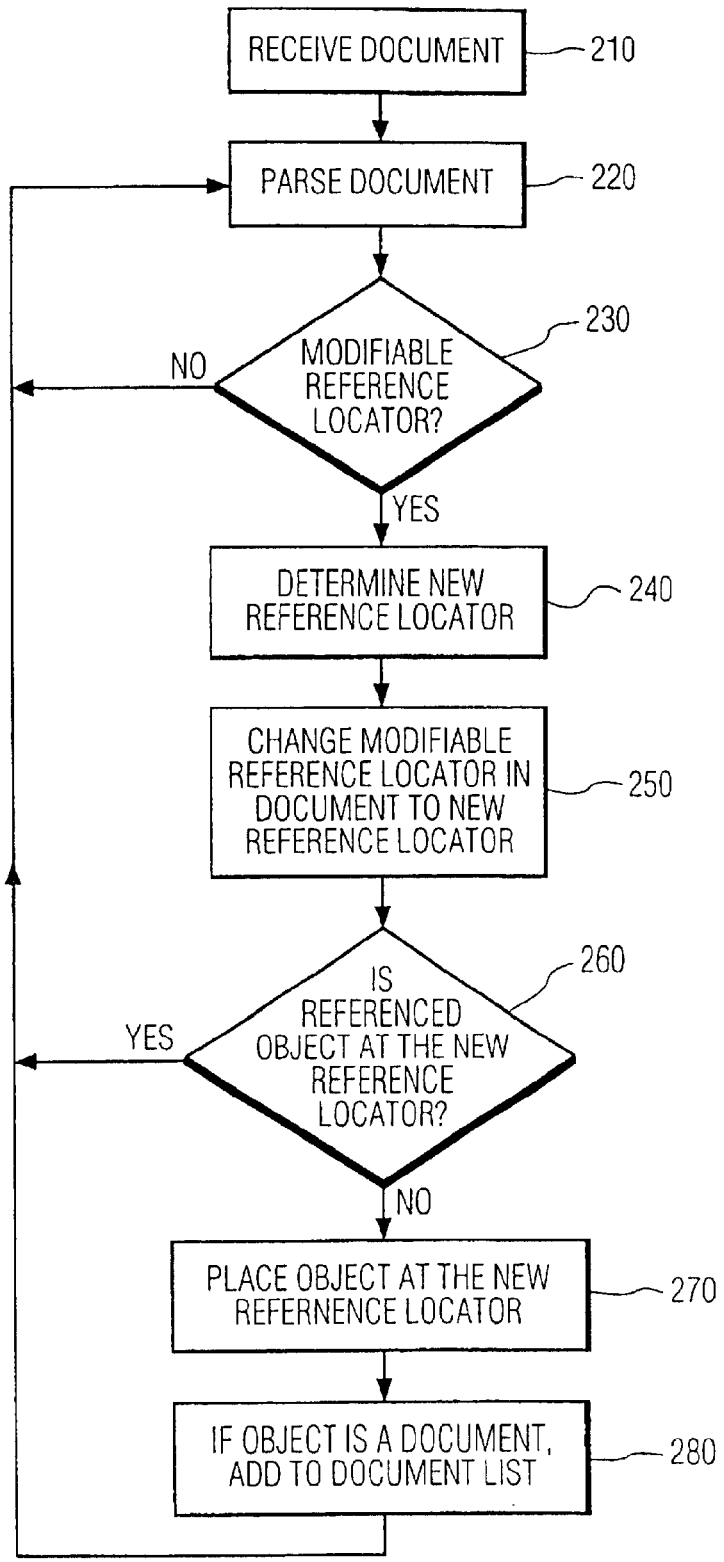
FIG. 2 illustrates a flowchart for processing a hypertext document in accordance with this invention.

FIG. 2 illustrates a flowchart for processing hypertext documents in accordance with this invention. The document is received at 210, and is processed via the loop 220–280. At 220–230, the document is parsed until a modifiable reference locator is found in the document. A new reference locator corresponding to the modifiable reference locator is determined at 240. As discussed above, if a new reference locator has already been determined corresponding to the current modifiable reference locator, this same new reference locator is determined at 240. The current modifiable reference locator is replaced by the new reference locator, at 250. At 260–270, if the object that is referenced by the modifiable reference locator is not located at the new reference locator, the object, or a copy of the object, is placed there. If the referenced object is a document, or any data set which may contain reference locators, the object is placed on a document list for subsequent processing, at 280. Each document in the document list is similarly processed, starting at 210, and ending when the entire document is parsed and processed via loop 220–280. As would be evident to one of ordinary skill in the art, the flowchart of FIG. 2 may be implemented as a recursive function. When an object is identified as a document, at 280, the recursive processing function can be initiated for this object document, thereby obviating the need to maintain a document list.

Figure 3:
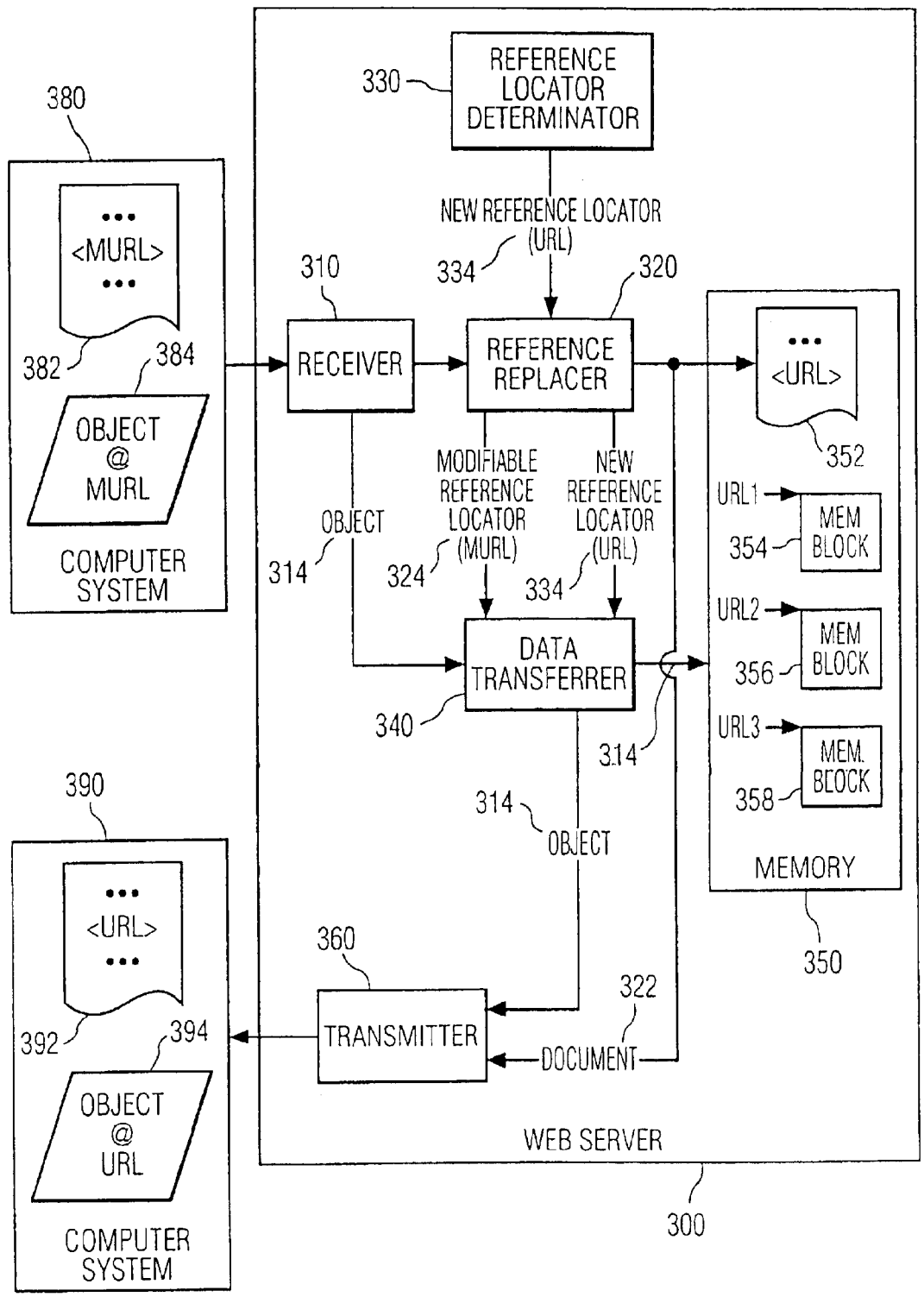
FIG. 3 illustrates an example block diagram of a system for transferring hypertext documents in accordance with this invention

FIG. 3 illustrates an example block diagram of a system for transferring hypertext documents in accordance with this invention, comprising two computer systems 380, 390 and a web server 300. In this example, computer system 380 is the authoring system, whereat the hypertext document 382 and objects 384 referenced by modifiable reference locators are created and/or stored. For this example, the terms Universal Resource Locator (URL) and Modifiable URL (MURL) are used as particular examples of reference locators. After completing the authoring task, the author transfers the document 382 and objects 384 to the web server 300, for access by others, termed recipients. The Web server 300 receives the document 382 from the computer system 380, via the receiver 310, and communicates the document 382 to the reference replacer 320. The reference replacer 320 parses the document 382 to identify MURLs within the document. To replace an MURL, the reference replacer 320 replaces the MURL in the document 382 with a new reference locator (URL) 334 that is provided by the reference locator determinator 330. The modified document 382 is stored in a memory 350 at the web server 300.

The reference replacer 320 communicates the MURL 324 and the URL 334 to the data transferrer 340. If the object that is referenced by the MURL 324 has not yet been placed at the URL 334, the data transferrer 340 receives the object 384 from the computer system 380, via the receiver 310. For clarity, the received object is identified as object 314 in FIG. 3. As shown, the memory 350 of the web server 300 has memory blocks 354, 356, 358 for storing objects, each block being addressed by a URL (URL1, URL2, URL3, etc.). The reference locator determinator 330 allocates one of the available URLs of the web server 300 as the new reference locator URL 334, and the data transferrer 340 transfers the object 314 to the memory 350 for storage at the corresponding URL1, URL2, URL3, etc.

Also shown in FIG. 3 is a communication with a computer system 390. In this example, computer system 390 is termed the destination system, to illustrate the transfer of a hypertext document from a computer system 380 to a computer system 390 via a web server 300. A user of the invention may specify a destination path for the reference locator determinator that is not contained within the memory 350 of the web server 300. When the data transferrer 340 receives a URL 334 that is not local to the web server 300, it establishes a communication link with the destination system and transmits each object 314 to the destination system via the transmitter 360. The transmitter 360 also transmits the document 322 to the destination system, after the reference replacer replaces each of the MURLs 324 with a corresponding URL 334. The destination system, in this example computer system 390 receives the document 322, which for clarity is shown in FIG. 3 as received document 392; it also receives the object 314 and stores it at the address corresponding to the URL 334, shown as stored object 394 in FIG. 3. If a communications path cannot be established immediately with the destination system, computer system 390, the document 322 and each object 314 may be stored in the local memory 350 of the web server.

In a general case, the author at computer system 380 may transfer the document 382 and objects 384 to the web server 300 using the technique discussed above with regard to web server storage. One or more other users may then access the web server 300 and transfer the modified document 352 and the referenced objects in the memory 350 to their destination computer systems 390 for local viewing. An example of this process is shown in FIGS. 4A–4C.

Figure 4A:
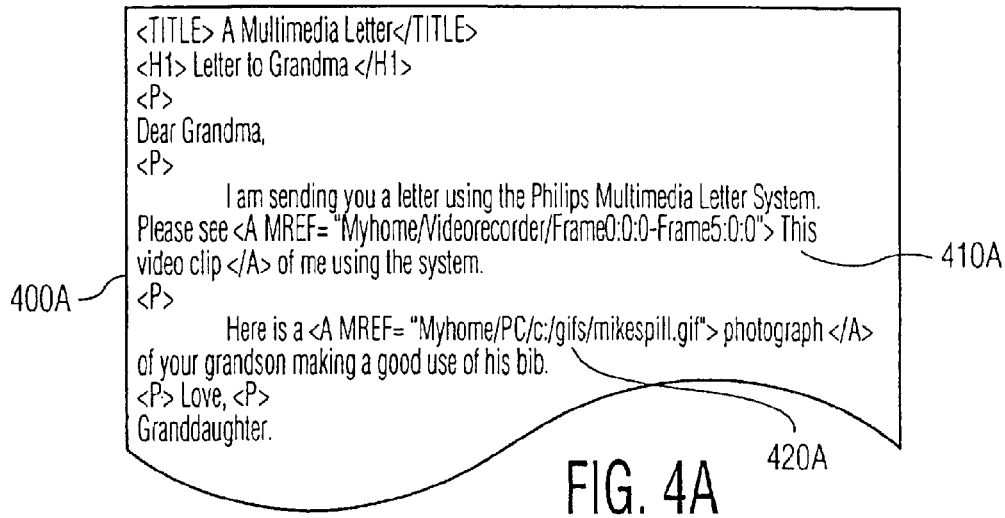
FIGS. 4A–4C illustrate a modification of reference locators within a hypertext document in accordance with this invention.
Figure 4B:
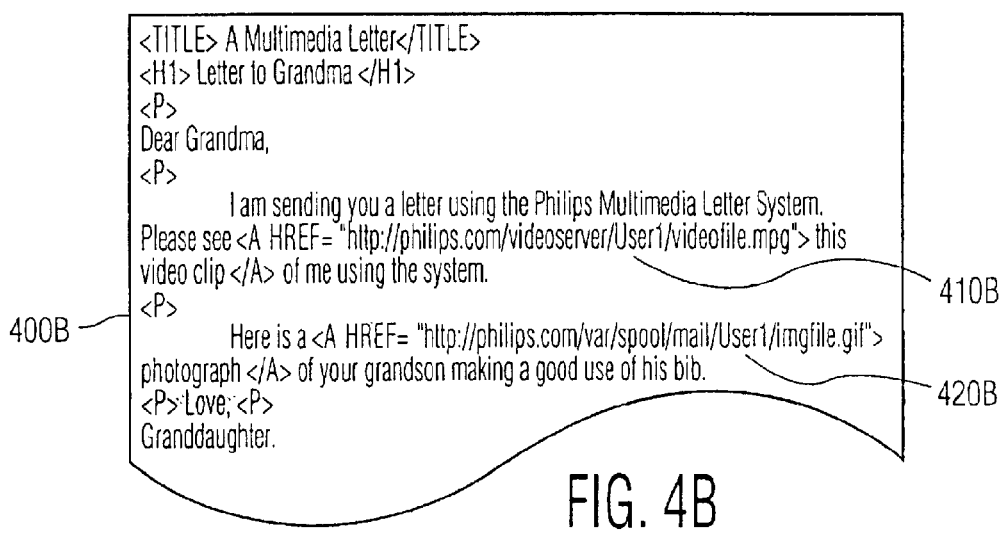
Figure 4C:
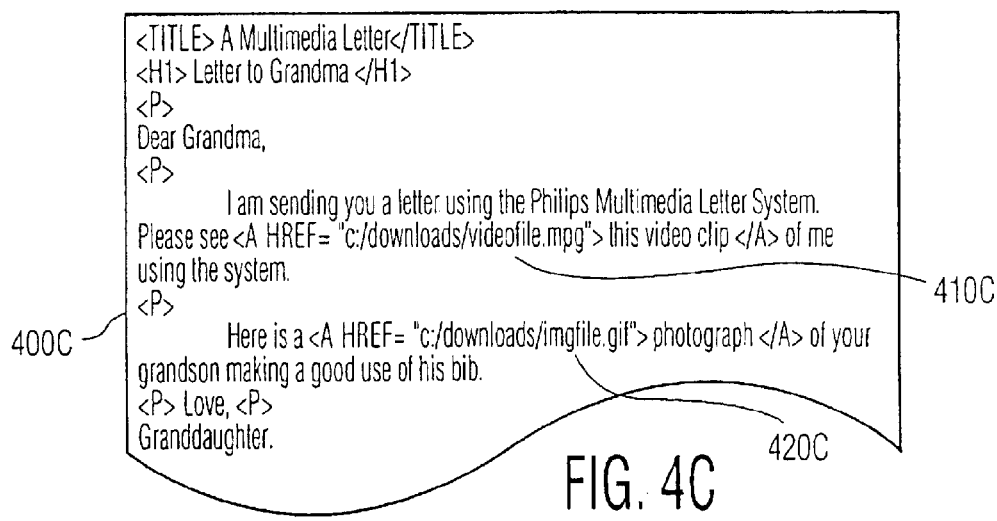

FIGS. 4A–4C illustrate a modification of reference locators within a hypertext document in accordance with this invention. FIG. 4A is an authored document 400A, a letter written as a hypertext document. The letter 400A contains two modifiable reference locators 410A and 420A. In this example, the reference locators 410A and 420A are identified by the author as being modifiable by the use of the keyword "<A MREF=". The reference locator 410A references frames of a video recording. The frames are accessible via a reference to "Frame0,0,0-Frame5,0,0" at a "videorecorder" that is at "Myhome", illustrating, for example, a home computer system in which devices such as video recorders are accessible via a network within the home. The reference locator 420A references a photograph stored as a "gif" image. The photograph is accessible via a reference to "mikespill.gif" at a file directory "gifs" that is on a "c:" drive of a computer "PC" in the "Myhome" network. Conventionally, for another user to access the referenced video frames and picture from this hypertext document 400A, the other user would need a direct access to the network "Myhome" and the referenced "videorecorder" and the referenced "PC" file structure leading to the "mikespill.gif". Also, at the time the other user accessed the "videorecorder", the appropriate videotape would need to be in the video recorder.

In accordance with one aspect of this invention, the document 400A and the objects referenced by each modifiable reference locator are uploaded to a web server. In this process, the modifiable reference locators 410A and 420A of the document 400A are modified to reflect the new locations of the referenced objects. The modified copy of document 400A is shown in FIG. 4B as document 400B, with modified reference locators 410B and 420B. As discussed previously, in accordance with one aspect of this invention, the objects referenced by the reference locators in the source document are placed at locations in the destination web server memory. In the example of FIGS. 4A–4B, the frames of the video recording that are referenced by the modifiable reference locator 410A is stored at reference locator 410B as an MPEG file "videofile.mpg" in a file directory "User1" of a "videoserver" on the machine "http://philips.com". If another user is given access to the "User1" directory of the referenced video server, the other user can view the video file that corresponds to the referenced frames on the "Myhome" video recorder. Once an object referenced by a modifiable reference locator is relocated to the location identified by the reference locator in the modified hypertext document, it need no longer reside at the source reference locator. That is, once the frames referenced by reference locator 410A are uploaded to the web server, the video recorder is no longer required to access the frames. Similarly, the photograph at reference locator 420A is uploaded to a reference locator 420B. Reference locator 420B identifies a file "imgfile.gif" at the "User1" file directory at "http://philips.com/var/spool/mail", illustrating, for example, a mail service at the web server. As noted above, once the object referenced by the reference locator 420A is uploaded to 420B, access to the "mikespill.gif" file on the "Myhome" network is no longer required for another user to view the referenced photograph.

In accordance with another aspect of this invention, the document 400A or 400B and the objects referenced by each modifiable reference locator may be communicated to another computer system as shown in FIG. 4C. If the other computer system, the destination system, is in direct contact with the authoring computer system, the document 400A and the objects referenced by the reference locators 410A and 420B are transferred directly to the destination system. The reference locators 410A and 420A in document 400A are modified to be reference locators 410C and 420C in document 400C, in the same manner as discussed above with regard to an upload to a web server. Alternatively, if the document 400A and the objects referenced by each modifiable reference locator 410A and 420A are uploaded to the web server as document 400B and reference locators 410B and 420B, the authoring system and the destination system need not be in direct contact. The user at the destination system accesses the web server and either views the document 400B and the referenced objects on the web server, or downloads the document 400B and the referenced objects to the destination system. By downloading the document 400B and the referenced objects, the user is able to repeatedly view the document and referenced objects without further access to the web server. The reference locators 410B and 420B are not expressly identified as modifiable reference locators. In a preferred embodiment of this invention, when the user initiates the download of the document 400B, the web server will prompt the user for authorization to download each object, and also allows the user to specify the destination location for each object, or to specify a default path name for all downloaded objects. If the user does not authorize the download of an object, the reference locator associated 11 with that object is treated as a non-modifiable reference locator.

In the example of FIGS. 4B–4C, the frames of the video referenced by reference locator 410B are downloaded to an MPEG file "videofile.mpg" in a "downloads" file directory on the destination system's "c:" drive. The photograph referenced by 420B is downloaded to an "imgfile.gif" in the same "downloads" file directory. In this example, the file names of the source and destination reference locators are the same, illustrating the use of a default reference locator naming convention as discussed above. Note that if the destination system is configured to have devices such as a video recorder accessible via a reference locator, as in the authoring system, the destination reference locator 410C could refer to the video recorder, thereby providing for a download directly to the reference video recorder. In this manner, for example, if the authoring system and the destination system were in direct contact, the actual video recording could be transferred from one video recorder to the other, obviating the need to create and store an intermediate MPEG file.

The examples and illustrations discussed above are presented for illustrating purposes, and alternative embodiments and applications will be apparent to one of ordinary skill in the art. For example, the parsing and processing may be effected at either the source or destination system, and the transfer of the objects corresponding to the reference locators may be effected via techniques common in the art. Similarly, if the source system is easily contacted, for example the source and destination systems both being web servers, the actual transfer of the objects corresponding to the reference locators may not occur at the same time that the hypertext document is transferred. A system in accordance with the principles of this invention can be configured to allocate new reference locators to effect the hypertext document transfer, and then upload the referenced object when the document is accessed and the particular hypertext entry is first accessed. In this manner, only those objects that are selected at least once will actually be transferred to the destination system. These and other variations will be recognized by one of ordinary skill in the art and are thus within the spirit and scope of this invention.

I claim:

1. A method for relocating objects comprising the steps of:

parsing a document for a first reference locator that references an object in a first file system;

determining a second reference locator that references a target location in a second file system;

placing a copy of the object at the target location in the second file system; and replacing the first reference locator in the document with the second reference locator.

2. The method of claim 1, further including the step of:

removing the object from the first file system.

3. The method of claim 1, further including the step of:

establishing a communications link with the first file system for receiving the copy of the object.

4. The method of claim 1, further including the step of:

establishing a communications link with the second file system for communicating the copy of the object.

5. The method of claim 1, wherein the object is one of the following:

an audio message, a digital image, a video image, an audio-video recording, and another document.

6. The method of claim 1, wherein the first file system is associated with one of the following:

a personal computer system, a network computer, and a Web server.

7. The method of claim 1, wherein
the document is a Hypertext Markup Language document, and the first and the second reference locators are Universal Resource Locators.

8. A program containing instructions for execution by a computer, the program comprising:
a parser that parses a document and identifies a first reference to an object;
an address determinator that identifies a second reference;
a data transferrer that receives the object and transfers it to the second reference; and,
a reference replacer that replaces the first reference with the second reference.

9. The program of claim 8, wherein:
the first reference is to a first memory device of a first computer, and,
the second reference is to a second memory device of a second-computer.

10. The program of claim 8, wherein
the document is a Hypertext Markup Language document, and the first and the second references are Universal Resource Locators.

11. A web-server comprising:
a memory for storing a plurality of objects, each object of the plurality of objects being identified by a corresponding Universal Resource Locator (URL),
a receiver for receiving a document from a first computer system, the document containing at least one Modifiable Universal Resource Locator (MURL) that identifies a source object at the first computer system,
a data transferrer that receives the source object at the at least one MURL and stores it in a memory at a destination URL, and
a reference replacer that replaces the at least one MURL with the destination URL in a copy of the document.

12. The web-server of claim 11, further including:
a transmitter for transferring the document and the source object to a second computer system, and
a reference locator for determining at least one remote locator for storing the source object to the second computer system;
wherein the reference replacer replaces the at least one MURL with the at least one remote locator.

* * * * *